(12) United States Patent
Hellestam (10) Patent No.: US 11,072,117 B2
(45) Date of Patent: Jul. 27, 2021

(54) PLATFORM DEVICE

(71) Applicant: Arcam AB, Moelndal (SE)

(72) Inventor: Calle Hellestam, Goeteborg (SE)

(73) Assignee: Arcam AB, Moelndal (SE)

( * ) Notice: Subject to any disclaimer, the term of this patent is extended or adjusted under 35 U.S.C. 154(b) by 360 days.

(21) Appl. No.: 16/154,415

(22) Filed: Oct. 8, 2018

(65) Prior Publication Data
US 2019/0160749 A1 May 30, 2019

Related U.S. Application Data

(60) Provisional application No. 62/590,887, filed on Nov. 27, 2017.

(51) Int. Cl.
*B29C 64/232* (2017.01)
*B29C 64/241* (2017.01)
*B29C 64/153* (2017.01)
*B22F 12/00* (2021.01)
*B29C 64/245* (2017.01)
(Continued)

(52) U.S. Cl.
CPC ............ *B29C 64/241* (2017.08); *B22F 12/00* (2021.01); *B29C 64/153* (2017.08); *B29C 64/232* (2017.08); *B29C 64/236* (2017.08); *B29C 64/245* (2017.08); *B29C 64/393* (2017.08); *B22F 10/10* (2021.01); *B33Y 10/00* (2014.12); *B33Y 30/00* (2014.12)

(58) Field of Classification Search
CPC .... B29C 64/232; B29C 64/241; B29C 64/245
See application file for complete search history.

(56) References Cited

U.S. PATENT DOCUMENTS

| 2,264,968 A | 12/1941 | De Forest |
| 2,323,715 A | 7/1943 | Kuehni |

(Continued)

FOREIGN PATENT DOCUMENTS

| CA | 2860188 A1 | 6/2006 |
| CN | 101607311 A | 12/2009 |

(Continued)

OTHER PUBLICATIONS

Cheah, Chi-Mun, et al., "Automatic Algorithm for Generating Complex Polyhedral Scaffold Structure for Tissue Engineering", Tissue Engineering, 2004, pp. 595-610, vol. 10, No. 3/4, XP002691483.

(Continued)

*Primary Examiner* — Atul P. Khare
(74) *Attorney, Agent, or Firm* — Dinsmore & Shohl LLP (57) ABSTRACT

The invention relates to a platform device (4) for forming a three-dimensional article (2) in an additive manufacturing machine layer by layer by successive fusion of selected areas of powder layers (3), which selected areas correspond to successive layers of the three-dimensional article. The platform device (4) has a support member (5) with a surface (6) for receiving powder. The support member (5) is rotatable about a first rotation axis (13) extending in a direction (15) substantially perpendicular to the surface (6). The support member (5) and the first rotation axis (13) are rotatable about a second rotation axis (14) arranged substantially in parallel with and off-set to the first rotation axis (13).

20 Claims, 7 Drawing Sheets

(51) Int. Cl.
    *B29C 64/393*     (2017.01)
    *B29C 64/236*     (2017.01)
    *B22F 10/10*     (2021.01)
    *B33Y 10/00*     (2015.01)
    *B33Y 30/00*     (2015.01)

(56) References Cited

U.S. PATENT DOCUMENTS

| | | |
|---|---|---|
| 3,634,644 A | 1/1972 | Ogden et al. |
| 3,838,496 A | 10/1974 | Kelly |
| 3,882,477 A | 5/1975 | Mueller |
| 3,906,229 A | 9/1975 | Demeester et al. |
| 3,908,124 A | 9/1975 | Rose |
| 4,314,134 A | 2/1982 | Schumacher et al. |
| 4,348,576 A | 9/1982 | Anderl et al. |
| 4,352,565 A | 10/1982 | Rowe et al. |
| 4,401,719 A | 8/1983 | Kobayashi et al. |
| 4,541,055 A | 9/1985 | Wolfe et al. |
| 4,651,002 A | 3/1987 | Anno |
| 4,818,562 A | 4/1989 | Arcella et al. |
| 4,863,538 A | 9/1989 | Deckard |
| 4,888,490 A | 12/1989 | Bass et al. |
| 4,927,992 A | 5/1990 | Whitlow et al. |
| 4,958,431 A | 9/1990 | Clark et al. |
| 4,988,844 A | 1/1991 | Dietrich et al. |
| 5,118,192 A | 6/1992 | Chen et al. |
| 5,135,695 A | 8/1992 | Marcus |
| 5,167,989 A | 12/1992 | Dudek et al. |
| 5,182,170 A | 1/1993 | Marcus et al. |
| 5,204,055 A | 4/1993 | Sachs et al. |
| 5,247,560 A | 9/1993 | Hosokawa et al. |
| 5,393,482 A | 2/1995 | Benda et al. |
| 5,483,036 A | 1/1996 | Giedt et al. |
| 5,508,489 A | 4/1996 | Benda et al. |
| 5,511,103 A | 4/1996 | Hasegawa |
| 5,595,670 A | 1/1997 | Mombo Caristan |
| 5,647,931 A | 7/1997 | Retallick et al. |
| 5,753,274 A | 5/1998 | Wilkening et al. |
| 5,837,960 A | 11/1998 | Lewis et al. |
| 5,876,550 A | 3/1999 | Feygin et al. |
| 5,904,890 A | 5/1999 | Lohner et al. |
| 5,932,290 A | 8/1999 | Lombardi et al. |
| 6,046,426 A | 4/2000 | Jeantette et al. |
| 6,162,378 A | 12/2000 | Bedal et al. |
| 6,204,469 B1 | 3/2001 | Fields et al. |
| 6,419,203 B1 | 7/2002 | Dang |
| 6,537,052 B1 | 3/2003 | Adler |
| 6,554,600 B1 | 4/2003 | Hofmann et al. |
| 6,583,379 B1 | 6/2003 | Meiners et al. |
| 6,676,892 B2 | 1/2004 | Das et al. |
| 6,724,001 B1 | 4/2004 | Pinckney et al. |
| 6,746,506 B2 | 6/2004 | Liu et al. |
| 6,751,516 B1 | 6/2004 | Richardson |
| 6,764,636 B1 | 7/2004 | Allanic et al. |
| 6,811,744 B2 | 11/2004 | Keicher et al. |
| 6,815,636 B2 | 11/2004 | Chung et al. |
| 6,824,714 B1 | 11/2004 | Türck et al. |
| 7,003,864 B2 | 2/2006 | Dirscherl |
| 7,020,539 B1 | 3/2006 | Kovacevic et al. |
| 7,165,498 B2 | 1/2007 | Mackrill et al. |
| 7,204,684 B2 | 4/2007 | Ederer et al. |
| 7,291,002 B2 | 11/2007 | Russell et al. |
| 7,452,500 B2 | 11/2008 | Uckelmann |
| 7,454,262 B2 | 11/2008 | Larsson et al. |
| 7,537,722 B2 | 5/2009 | Andersson et al. |
| 7,540,738 B2 | 6/2009 | Larsson et al. |
| 7,569,174 B2 | 8/2009 | Ruatta et al. |
| 7,635,825 B2 | 12/2009 | Larsson |
| 7,686,605 B2 | 3/2010 | Perret et al. |
| 7,696,501 B2 | 4/2010 | Jones |
| 7,713,454 B2 | 5/2010 | Larsson |
| 7,754,135 B2 | 7/2010 | Abe et al. |
| 7,799,253 B2 | 9/2010 | Höchsmann et al. |
| 7,871,551 B2 | 1/2011 | Wallgren et al. |
| 8,021,138 B2 | 9/2011 | Green |
| 8,083,513 B2 | 12/2011 | Montero-Escuder et al. |
| 8,137,739 B2 | 3/2012 | Philippi et al. |
| 8,187,521 B2 | 5/2012 | Larsson et al. |
| 8,308,466 B2 | 11/2012 | Ackelid et al. |
| 8,992,816 B2 | 3/2015 | Jonasson et al. |
| 9,073,265 B2 | 7/2015 | Snis |
| 9,079,248 B2 | 7/2015 | Ackelid |
| 9,126,167 B2 | 9/2015 | Ljungblad |
| 9,254,535 B2 | 2/2016 | Buller et al. |
| 9,310,188 B2 | 4/2016 | Snis |
| 9,321,215 B2 * | 4/2016 | Dudley ............... B29C 64/135 |
| 9,505,172 B2 | 11/2016 | Ljungblad |
| 9,550,207 B2 | 1/2017 | Ackelid |
| 9,802,253 B2 | 10/2017 | Jonasson |
| 9,950,367 B2 | 4/2018 | Backlund et al. |
| 10,071,422 B2 | 9/2018 | Buller et al. |
| 10,099,466 B2 * | 10/2018 | Skogsrud ............... B33Y 10/00 |
| 10,786,865 B2 * | 9/2020 | Hellestam ......... B23K 15/0086 |
| 2002/0104973 A1 | 8/2002 | Kerekes |
| 2002/0152002 A1 | 10/2002 | Lindemann et al. |
| 2002/0195747 A1 | 12/2002 | Hull et al. |
| 2003/0043360 A1 | 3/2003 | Farnworth |
| 2003/0133822 A1 | 7/2003 | Harryson |
| 2003/0205851 A1 | 11/2003 | Laschutza et al. |
| 2004/0012124 A1 | 1/2004 | Li et al. |
| 2004/0026807 A1 | 2/2004 | Andersson et al. |
| 2004/0084814 A1 | 5/2004 | Boyd et al. |
| 2004/0104499 A1 | 6/2004 | Keller |
| 2004/0148048 A1 | 7/2004 | Farnworth |
| 2004/0173496 A1 | 9/2004 | Srinivasan |
| 2004/0173946 A1 | 9/2004 | Pfeifer et al. |
| 2004/0204765 A1 | 10/2004 | Fenning et al. |
| 2004/0217095 A1 | 11/2004 | Herzog |
| 2005/0173380 A1 | 8/2005 | Carbone |
| 2005/0186538 A1 | 8/2005 | Uckelmann |
| 2005/0282300 A1 | 12/2005 | Yun et al. |
| 2006/0108712 A1 | 5/2006 | Mattes |
| 2006/0138325 A1 | 6/2006 | Choi |
| 2006/0145381 A1 | 7/2006 | Larsson |
| 2006/0147332 A1 | 7/2006 | Jones et al. |
| 2006/0157892 A1 | 7/2006 | Larsson |
| 2006/0180957 A1 | 8/2006 | Hopkinson et al. |
| 2006/0284088 A1 | 12/2006 | Fukunaga et al. |
| 2007/0074659 A1 | 4/2007 | Wahlstrom |
| 2007/0175875 A1 | 8/2007 | Uckelmann et al. |
| 2007/0179655 A1 | 8/2007 | Farnworth |
| 2007/0182289 A1 | 8/2007 | Kigawa et al. |
| 2007/0298182 A1 | 12/2007 | Perret et al. |
| 2008/0109102 A1 * | 5/2008 | Sutcliffe ............... B29C 64/165 |
| | | 700/119 |
| 2008/0236738 A1 | 10/2008 | Lo et al. |
| 2009/0017219 A1 | 1/2009 | Paasche et al. |
| 2009/0152771 A1 | 6/2009 | Philippi et al. |
| 2009/0206056 A1 | 8/2009 | Xu et al. |
| 2010/0007062 A1 | 1/2010 | Larsson et al. |
| 2010/0260410 A1 | 10/2010 | Taminger et al. |
| 2010/0305743 A1 | 12/2010 | Larsson |
| 2010/0310404 A1 | 12/2010 | Ackelid |
| 2010/0316856 A1 | 12/2010 | Currie et al. |
| 2011/0061591 A1 | 3/2011 | Stecker |
| 2011/0114839 A1 | 5/2011 | Stecker et al. |
| 2011/0133367 A1 | 6/2011 | Weidinger et al. |
| 2011/0240607 A1 | 10/2011 | Stecker et al. |
| 2011/0241575 A1 | 10/2011 | Caiafa et al. |
| 2011/0293770 A1 | 12/2011 | Ackelid et al. |
| 2011/0293771 A1 | 12/2011 | Oberhofer et al. |
| 2011/0309554 A1 | 12/2011 | Liska et al. |
| 2011/0316178 A1 | 12/2011 | Uckelmann |
| 2012/0100031 A1 | 4/2012 | Ljungblad |
| 2012/0164322 A1 | 6/2012 | Teulet et al. |
| 2012/0183701 A1 | 7/2012 | Pilz et al. |
| 2012/0193530 A1 | 8/2012 | Parker et al. |
| 2012/0211155 A1 | 8/2012 | Wehning et al. |
| 2012/0223059 A1 | 9/2012 | Ackelid |
| 2012/0225210 A1 | 9/2012 | Fruth |
| 2012/0237745 A1 | 9/2012 | Dierkes et al. |
| 2012/0266815 A1 | 10/2012 | Brunermer |
| 2013/0055568 A1 | 3/2013 | Dusel et al. |
| 2013/0162134 A1 | 6/2013 | Mattausch et al. |

(56) References Cited

U.S. PATENT DOCUMENTS

| | | |
|---|---|---|
| 2013/0186514 A1 | 7/2013 | Zhuang et al. |
| 2013/0216959 A1 | 8/2013 | Tanaka et al. |
| 2013/0233846 A1 | 9/2013 | Jakimov et al. |
| 2013/0264750 A1 | 10/2013 | Hofacker et al. |
| 2013/0270750 A1 | 10/2013 | Green |
| 2013/0278920 A1 | 10/2013 | Loewgren |
| 2013/0300286 A1 | 11/2013 | Ljungblad et al. |
| 2013/0343947 A1 | 12/2013 | Satzger et al. |
| 2014/0175708 A1 | 6/2014 | Echigo et al. |
| 2014/0271964 A1 | 9/2014 | Roberts, IV et al. |
| 2014/0301884 A1 | 10/2014 | Hellestam et al. |
| 2014/0308153 A1 | 10/2014 | Ljungblad |
| 2014/0314609 A1 | 10/2014 | Ljungblad et al. |
| 2014/0314964 A1 | 10/2014 | Ackelid |
| 2014/0348691 A1 | 11/2014 | Ljungblad et al. |
| 2014/0363327 A1 | 12/2014 | Holcomb |
| 2014/0367367 A1 | 12/2014 | Wood et al. |
| 2015/0004045 A1 | 1/2015 | Ljungblad |
| 2015/0050463 A1 | 2/2015 | Nakano et al. |
| 2015/0071809 A1 | 3/2015 | Nordkvist et al. |
| 2015/0086409 A1 | 3/2015 | Hellestam |
| 2015/0088295 A1 | 3/2015 | Hellestam |
| 2015/0130118 A1 | 5/2015 | Cheng et al. |
| 2015/0139849 A1 | 5/2015 | Pialot, Jr. et al. |
| 2015/0151490 A1 | 6/2015 | Jonasson et al. |
| 2015/0165524 A1 | 6/2015 | Ljungblad et al. |
| 2015/0165525 A1 | 6/2015 | Jonasson |
| 2015/0174658 A1 | 6/2015 | Ljungblad |
| 2015/0174695 A1 | 6/2015 | Elfstroem et al. |
| 2015/0251249 A1 | 9/2015 | Fager |
| 2015/0273622 A1 | 10/2015 | Manabe |
| 2015/0283610 A1 | 10/2015 | Ljungblad et al. |
| 2015/0283613 A1 | 10/2015 | Backlund et al. |
| 2015/0290710 A1 | 10/2015 | Ackelid |
| 2015/0306819 A1 | 10/2015 | Ljungblad |
| 2016/0052056 A1 | 2/2016 | Fager |
| 2016/0052079 A1 | 2/2016 | Ackelid |
| 2016/0054115 A1 | 2/2016 | Snis |
| 2016/0054121 A1 | 2/2016 | Snis |
| 2016/0054347 A1 | 2/2016 | Snis |
| 2016/0059314 A1 | 3/2016 | Ljungblad et al. |
| 2016/0129501 A1 | 5/2016 | Loewgren et al. |
| 2016/0167160 A1 | 6/2016 | Hellestam |
| 2016/0167303 A1 | 6/2016 | Petelet |
| 2016/0202042 A1 | 7/2016 | Snis |
| 2016/0202043 A1 | 7/2016 | Snis |
| 2016/0211116 A1 | 7/2016 | Lock |
| 2016/0236279 A1 | 8/2016 | Ashton et al. |
| 2016/0279735 A1 | 9/2016 | Hellestam |
| 2016/0282848 A1 | 9/2016 | Hellestam |
| 2016/0303687 A1 | 10/2016 | Ljungblad |
| 2016/0307731 A1 | 10/2016 | Lock |
| 2016/0311021 A1 | 10/2016 | Elfstroem et al. |
| 2017/0080494 A1 | 3/2017 | Ackelid |
| 2017/0087661 A1 | 3/2017 | Backlund et al. |
| 2017/0106443 A1 | 4/2017 | Karlsson |
| 2017/0106570 A1 | 4/2017 | Karlsson |
| 2017/0136541 A1 | 5/2017 | Fager |
| 2017/0136542 A1 | 5/2017 | Nordkvist et al. |
| 2017/0173691 A1 | 6/2017 | Jonasson |
| 2017/0189964 A1 | 7/2017 | Backlund et al. |
| 2017/0227417 A1 | 8/2017 | Snis |
| 2017/0227418 A1 | 8/2017 | Snis |
| 2017/0246684 A1 | 8/2017 | Hellestam |
| 2017/0246685 A1 | 8/2017 | Hellestam |
| 2017/0259338 A1 | 9/2017 | Ackelid |
| 2017/0282248 A1 | 10/2017 | Ljungblad et al. |
| 2017/0294288 A1 | 10/2017 | Lock |
| 2017/0341141 A1 | 11/2017 | Ackelid |
| 2017/0341142 A1 | 11/2017 | Ackelid |
| 2017/0348791 A1 | 12/2017 | Ekberg |
| 2017/0348792 A1 | 12/2017 | Fager |
| 2017/0348902 A1* | 12/2017 | Ohara ................... B33Y 50/02 |
| 2018/0009033 A1 | 1/2018 | Fager |
| 2018/0154444 A1 | 6/2018 | Jonasson |

FOREIGN PATENT DOCUMENTS

| | | |
|---|---|---|
| CN | 101635210 A | 1/2010 |
| CN | 201693176 U | 1/2011 |
| CN | 101607311 B | 9/2011 |
| CN | 203509463 U | 4/2014 |
| DE | 19952998 A1 | 5/2001 |
| DE | 20305843 U1 | 7/2003 |
| DE | 10235434 A1 | 2/2004 |
| DE | 102005014483 A1 | 10/2006 |
| DE | 202008005417 U1 | 8/2008 |
| DE | 102007018601 A1 | 10/2008 |
| DE | 102007029052 A1 | 1/2009 |
| DE | 102008012064 A1 | 9/2009 |
| DE | 102010041284 A1 | 3/2012 |
| DE | 102011105045 B3 | 6/2012 |
| DE | 102013210242 A1 | 12/2014 |
| EP | 0289116 A1 | 11/1988 |
| EP | 0322257 A2 | 6/1989 |
| EP | 0688262 A1 | 12/1995 |
| EP | 1358994 A1 | 11/2003 |
| EP | 1418013 A1 | 5/2004 |
| EP | 1466718 A2 | 10/2004 |
| EP | 1486318 A2 | 12/2004 |
| EP | 1669143 A1 | 6/2006 |
| EP | 1683593 A2 | 7/2006 |
| EP | 1721725 A1 | 11/2006 |
| EP | 1752240 A1 | 2/2007 |
| EP | 1952932 A2 | 8/2008 |
| EP | 2011631 A1 | 1/2009 |
| EP | 2119530 A1 | 11/2009 |
| EP | 2281677 A1 | 2/2011 |
| EP | 2289652 A1 | 3/2011 |
| EP | 2292357 A1 | 3/2011 |
| EP | 2832474 A1 | 2/2015 |
| FR | 2980380 A1 | 3/2013 |
| JP | H05-171423 A | 7/1993 |
| JP | 2003241394 A | 8/2003 |
| JP | 2003245981 | 9/2003 |
| JP | 2009006509 A | 1/2009 |
| JP | 2017517413 A | 6/2017 |
| SE | 524467 C2 | 8/2004 |
| WO | WO 1993/08928 A1 | 5/1993 |
| WO | WO 1996/012607 A1 | 5/1996 |
| WO | WO 1997/37523 A2 | 10/1997 |
| WO | WO 2001/081031 A1 | 11/2001 |
| WO | WO 2001/85386 A2 | 11/2001 |
| WO | WO 2002/008653 A1 | 1/2002 |
| WO | WO 2004/007124 A1 | 1/2004 |
| WO | WO 2004/043680 A2 | 5/2004 |
| WO | WO 2004/054743 A1 | 7/2004 |
| WO | WO 2004/056511 A1 | 7/2004 |
| WO | WO 2004/106041 A2 | 12/2004 |
| WO | WO 2004/108398 A1 | 12/2004 |
| WO | WO 2006/091097 A2 | 8/2006 |
| WO | WO 2006/121374 A1 | 11/2006 |
| WO | WO 2007/112808 A1 | 10/2007 |
| WO | WO 2007/147221 A1 | 12/2007 |
| WO | WO 2008/013483 A1 | 1/2008 |
| WO | WO 2008/057844 A1 | 5/2008 |
| WO | WO 2008/074287 A1 | 6/2008 |
| WO | WO 2008/125497 A1 | 10/2008 |
| WO | WO 2008/147306 A1 | 12/2008 |
| WO | WO 2009/000360 A1 | 12/2008 |
| WO | WO 2009/072935 A1 | 6/2009 |
| WO | WO 2009/084991 A1 | 7/2009 |
| WO | WO 2010/095987 A1 | 8/2010 |
| WO | WO 2010/125371 A1 | 11/2010 |
| WO | WO 2011/008143 A1 | 1/2011 |
| WO | WO 2011/011818 A1 | 2/2011 |
| WO | WO 2011/030017 A1 | 3/2011 |
| WO | WO 2011/060312 A2 | 5/2011 |
| WO | WO 2012/102655 A1 | 8/2012 |
| WO | WO 2013/092997 A1 | 6/2013 |
| WO | WO 2013/098050 A1 | 7/2013 |
| WO | WO 2013/098135 A1 | 7/2013 |
| WO | WO 2013/159811 A1 | 10/2013 |
| WO | WO 2013/167194 A1 | 11/2013 |
| WO | WO 2013/178825 A2 | 12/2013 |

(56) References Cited

FOREIGN PATENT DOCUMENTS

| WO | WO 2014/071968 A1 | 5/2014 | |
|---|---|---|---|
| WO | WO 2014/092651 A1 | 6/2014 | |
| WO | WO 2014/095200 A1 | 6/2014 | |
| WO | WO 2014/095208 A1 | 6/2014 | |
| WO | WO-2014092651 A1 * | 6/2014 | ........... B29C 64/106 |
| WO | WO 2014/195068 A1 | 12/2014 | |
| WO | WO 2015/032590 A2 | 3/2015 | |
| WO | WO 2015/091813 A1 | 6/2015 | |
| WO | WO 2015/120168 A1 | 8/2015 | |
| WO | WO 2015/142492 A1 | 9/2015 | |
| WO | 2018111240 A1 | 6/2018 | |
| WO | WO-2018111240 A1 * | 6/2018 | ........... B29C 64/277 |
| WO | WO-2021-003202 A2 * | 1/2021 | .............. B22F 10/00 |

OTHER PUBLICATIONS

Gibson, D.W., et al., "Additive Manufacturing Technologies: Rapid Prototyping to Direct Digital Manufacturing", 2010, pp. 126-129, Springer, New York.

Guibas, Leonidas J., et al., "Randomized Incremental Construction Of Delaunay And Voronoi Diagrams", Algorithmica, Jun. 1992, pp. 381-413, vol. 7, Issue 1-6, Springer-Verlag, New York.

Klassen, Alexander, et al., "Modelling of Electron Beam Absorption in Complex Geometries", *Journal Of Physics D: Applied Physics*, Jan. 15, 2014, 12 pages, vol. 47, No. 6, Institute Of Physics Publishing Ltd., Great Britain.

Motojima, Seiji, et al., "Chemical Vapor Growth Of LaB6 Whiskers and Crystals Having A Sharp Tip", Journal Of Crystal Growth, vol. 44, No. 1, Aug. 1, 1978 (Aug. 1, 1978), pp. 106-109.

Weigel, TH., et al., "Design and Preparation Of Polymeric Scaffolds For Tissue Engineering," Expert Rev. Med. Devices, 2006, pp. 835-851, vol. 3, No. 6, XP002691485.

Yang, et al., "The Design of Scaffolds for Use in Tissue Engineering, Part II, Rapid Prototyping Techniques", Tissue Engineering, 2002, pp. 1-11, vol. 8, No. 1, XP002691484.

International Search Report and Written Opinion dated Feb. 12, 2019 for PCT/EP2018/082610 (15 pages).

Japanese office action for application 2020-529214 dated May 11, 2021 (7 pages with English Translation).

* cited by examiner

PLATFORM DEVICE

CROSS REFERENCE TO RELATED APPLICATIONS

This application claims benefit of U.S. Provisional Patent Application No. 62/590,887, filed on Nov. 27, 2017, the contents of which as are hereby incorporated by reference in their entirety.

BACKGROUND

Related Field

Various embodiments of the present invention relate to a platform device and a method for forming a three-dimensional article in an additive manufacturing machine layer by layer by successive fusion of selected areas of powder layers, which selected areas correspond to successive layers of the three-dimensional article. In addition, the invention relates to a control unit for controlling such a platform device

Description of Related Art

Freeform fabrication or additive manufacturing (AM) using an energy beam, for example an electron beam or a laser beam, for melting a powder is a method for forming a solid three-dimensional article. The three-dimensional article is formed layer by layer by successive fusion of selected areas of powder layers, which selected areas correspond to successive layers of the three-dimensional article. A layer of powder, such as metal powder, is deposited on a surface and the energy beam is used to selectively melt the powder layer. The melted material solidifies and form a solid layer. A further layer of powder is deposited onto the previous layer, and the energy beam is used to selectively melt the further powder layer. The melted material fuses with an underlying layer and solidifies to form a top layer of the three-dimensional article. This process is repeated for multiple layers until the desired 3D geometry of the article is achieved.

An apparatus for forming such a three-dimensional article has a work plate on which the three-dimensional article is to be formed, a powder distributor device for delivering powder to the work plate for the formation of powder layers and an energy beam source for providing the energy beam used for melting the powder. Further, a control unit is used for controlling the energy beam to melt the selected areas of the powder layers.

During manufacturing in an AM machine where powder can be continuously added and selectively melted in different layers by using a rotatable work plate, the centre region of the work plate cannot be used for forming the article or the centre region is at least associated with some problems due to the low tangential speed in this region of the work plate.

BRIEF SUMMARY

Having this background, an object of the invention is to provide a platform device for forming a three-dimensional article, which platform device has improved usability and capacity.

The objective is achieved by various embodiments of a platform device for forming a three-dimensional article in an additive manufacturing machine layer by layer by successive fusion of selected areas of powder layers, which selected areas correspond to successive layers of the three-dimensional article, wherein the platform device has a support member with a surface for receiving powder, the support member is rotatable about a first rotation axis extending in a direction substantially perpendicular to the surface, and the support member and the first rotation axis are rotatable about a second rotation axis arranged substantially in parallel with and off-set to the first rotation axis.

Hereby also the center region being close to the first rotation axis of the support member, which has a relatively low tangential speed with respect to the first rotation axis in comparison to the outer periphery of the support member, can be moved by rotation about the second rotation axis. This in turn means that the entire surface or at least an increased portion of the surface of the support member can be used for continuously receiving powder to be selectively melted.

According to at least one embodiment, the platform device has a drive shaft extending along the second rotation axis for rotating the support member and the first rotation axis about the second rotation axis, and preferably the drive shaft is arranged for rotating the support member about the first rotation axis when the support member being rotated about the second rotation axis. Hereby, only one drive shaft is needed to achieve the rotational movements of the support member.

According to further embodiments, the platform device has a gear wheel and an internal gear member, wherein the gear wheel is attached and rotationally locked to the support member and arranged for rotating about the first rotation axis, and the gear wheel is in engagement with the internal gear member for movement about the second rotation axis. Hereby, rotation of the support member, about both the first rotation axis and the second rotation axis can be achieved by rotation of the gear wheel about its axis and movement of the gear wheel along the internal gear member, respectively. Further, the relationship between the angular speed about the first rotation axis and the angular speed about the second rotation axis is predetermined and can be selected by adapting the dimensions of the gear wheel and the internal gear member to each other.

According to yet other embodiments, the support member is arranged for linear movement in a direction in parallel with the first rotation axis. Hereby, the level of the top surface of the powder bed arranged on the support member can be maintained during manufacturing. The drive shaft can be arranged for linear movement in the direction in parallel with the first rotation axis for the linear movement of the support member. Hereby, no relative linear movement between the support member and the drive shaft is required.

According to another aspect of various embodiments of the invention, a further objective is to provide a method for forming a three-dimensional article in an additive manufacturing machine layer by layer by successive fusion of selected areas of powder layers, which selected areas correspond to successive layers of the three-dimensional article, which method enables an improved usability and capacity of a platform device having a support member with a surface for receiving powder.

This objective is achieved by an exemplary method for forming a three-dimensional article in an additive manufacturing machine layer by layer by successive fusion of selected areas of powder layers, which selected areas correspond to successive layers of the three-dimensional article, wherein the method comprises the steps of using a platform device having a support member with a surface for receiving powder, rotating the support member about a first rotation axis having an extension direction substantially perpendicular to the surface, and rotating the support member and the first rotation axis about a second rotation axis being arranged substantially in parallel with and off-set to the first rotation axis.

In addition, various embodiments of the invention relate to a control unit for controlling a platform device for forming a three-dimensional article in an additive manufacturing machine layer by layer by successive fusion of selected areas of powder layers, which selected areas correspond to successive layers of the three-dimensional article, and an apparatus for forming a three-dimensional article layer by layer by successive fusion of selected areas of powder layers, which selected areas correspond to successive layers of the three-dimensional article.

The advantages of the method, the control unit and the apparatus are substantially the same advantages already discussed hereinabove with reference to the different embodiments of the platform device.

Further advantages and advantageous features of the invention are disclosed in the following description and in the claims provided herein.

BRIEF DESCRIPTION OF THE SEVERAL VIEWS OF THE DRAWINGS

Having thus described the invention in general terms, reference will now be made to the accompanying drawings, which are not necessarily drawn to scale, and wherein:

DETAILED DESCRIPTION OF VARIOUS EMBODIMENTS

Various embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein. Rather, these embodiments are provided so that this disclosure will satisfy applicable legal requirements. Unless otherwise defined, all technical and scientific terms used herein have the same meaning as commonly known and understood by one of ordinary skill in the art to which the invention relates. The term "or" is used herein in both the alternative and conjunctive sense, unless otherwise indicated. Like numbers refer to like elements throughout.

Still further, to facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The term "three-dimensional structures" and the like as used herein refer generally to intended or actually fabricated three-dimensional configurations (e.g., of structural material or materials) that are intended to be used for a particular purpose. Such structures, etc. may, for example, be designed with the aid of a three-dimensional CAD system.

The term "electron beam" as used herein in various embodiments refers to any charged particle beam. The sources of charged particle beam can include an electron gun, a linear accelerator and so on.

Figure 1:
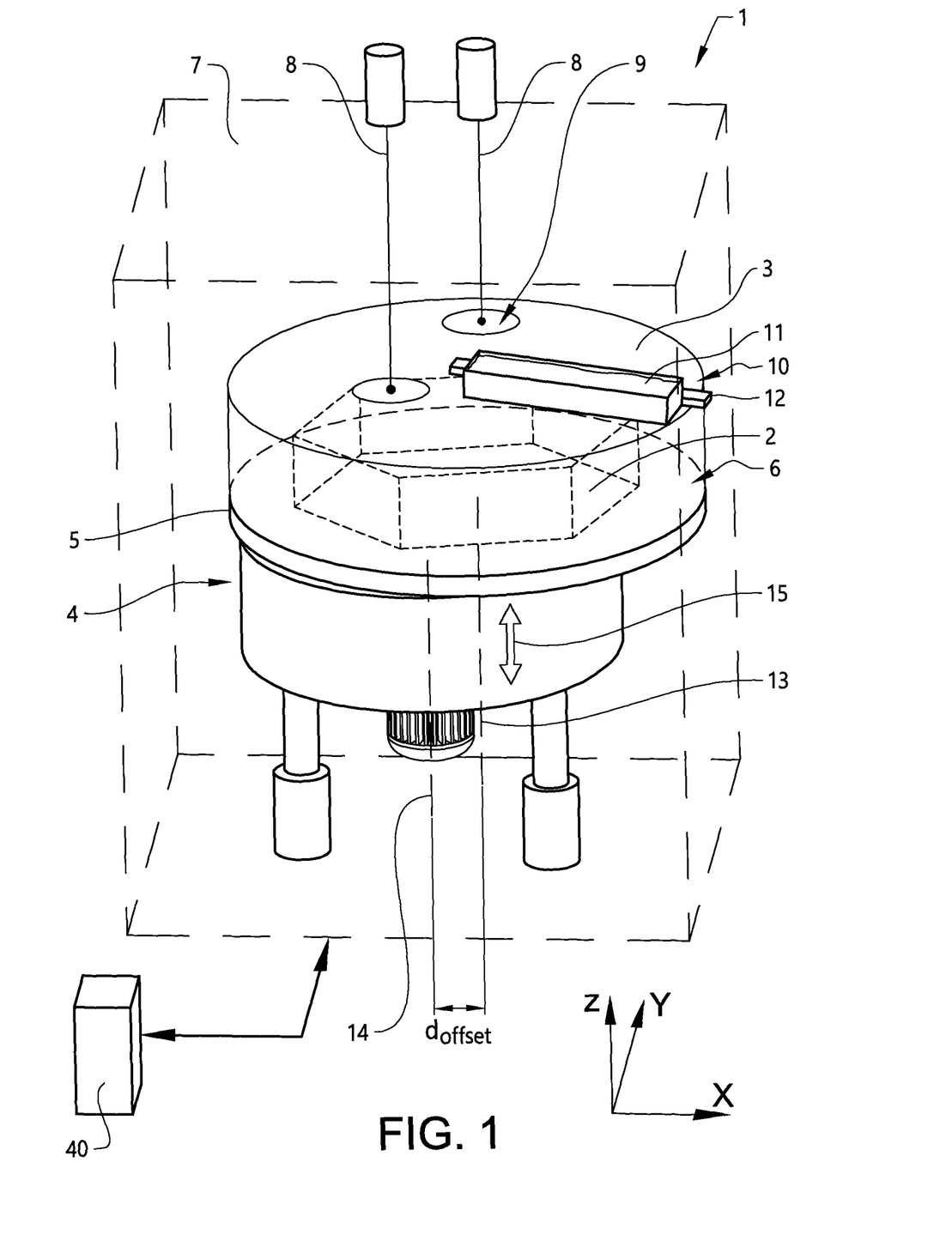
FIG. 1 is a schematic view of an additive manufacturing machine having a platform device with a rotatable work plate and a powder distributor device for continuously adding powder to the work plate.

FIG. 1 shows an apparatus or an additive manufacturing (AM) machine 1 for forming a three-dimensional article 2 layer by layer by successive fusion of selected areas of powder layers 3, which selected areas correspond to successive layers of the three-dimensional article. The apparatus 1 comprises a platform device 4 having a support member 5 with a surface 6 for receiving powder. The support member 5 is suitably arranged in a process chamber 7.

The process chamber 7 can be arranged for maintaining a vacuum environment to the support member 5 and the powder bed 3 by means of a vacuum system. Such a vacuum system is known to the person skilled in the art and is not further described or illustrated herein.

One or more energy beams, such as electron beams 8 or laser beams 8, can be used for selectively melting the powder. The energy beam is scanned over a top surface 9 of the powder bed 3 for melting the selected areas. The selected areas of each layer can be based on a model dividing the article to be manufactured in successive layers or slices. The model may be a computer model generated by a CAD (Computer Aided Design) tool.

The support member 5 is suitably a flat work plate for receiving the powder. The work plate can be circular. The surface 6 of the support member 5 is preferably substantially horizontal and is faced upwardly in a vertical direction. In other words; the powder receiving surface 6 can be arranged in a horizontal XY-plane having a vertical normal vector in a Z-direction, where the X-, Y- and Z-axes are perpendicular relative to each other and constitute a Cartesian coordinate system.

Further, the apparatus 1 comprises a powder distributor device 10. The powder distributor device 10 can have a powder storage 11 and a rake 12. Powder can be deposited from the powder storage 11 to the support member 5 of the platform device 4. For example, at the bottom of the powder storage 11 a slit can be arranged for depositing powder onto the support member 5 or a previously applied powder layer. The rake 12 can be movable or stationary and is used for ensuring the powder to be uniformly distributed and creating a relatively thin flat layer of powder. In the example embodiment illustrated in FIG. 1, the rake 12 is stationary whereas the support member 5 is intended to be intermittently or continuously rotated relative to the rake 12.

The support member 5 is rotatable about a first rotation axis 13 extending in a direction substantially perpendicular to the powder receiving surface 6. This first rotation axis 13 is preferably arranged in the centre of the support member 5. Since the powder receiving surface 6 is substantially horizontal, the first rotation axis 13 is suitably arranged to be directed substantially vertically. Thus, in FIG. 1 the first rotation axis 13 is in parallel with the Z-axis. Powder can be continuously deposited on the support member 5 while rotating the support member 5 about the first rotation axis 13. The thickness of the powder layer applied can be determined by selecting the distance between the powder bed 3 and the rake 12.

The support member 5 and the first rotation axis 13 are rotatable about a second rotation axis 14 arranged substantially in parallel with and off-set to the first rotation axis 13. The off-set distance between the first rotation axis 13 and the second rotation axis 14 is denoted doffset. The first rotation axis 13 and the second rotation axis 14 are suitably arranged with an off-set distance doffset relative to each other which is adapted to other relevant process and/or apparatus parameters. The off-set distance can be in the range 1 mm<doffset<200 mm, often in the range 5 mm<doffset<150 mm, and preferably in the range 20 mm<doffset<100 mm.

The support member 5 is also arranged for linear movement downwards in a direction 15 in parallel with the first rotation axis 13. Thus, in the example embodiment illustrated in FIG. 1, the support member is movable in the vertical direction in parallel with the Z-axis. By moving the support member 5 downwards at the same time as the support member 5 is rotated, while adding powder, the top surface 9 of the powder bed can be maintained at substantially the same level during the manufacturing of the article 2 that is built in the Z-direction layer by layer. Of course, the movement of the support member 5 required in the vertical direction is determined by the desired position of the top surface 9 of the powder bed relative to the energy beam position. Optionally, instead of or in combination with movement of the support member in the vertical direction, the energy beam position could be moved upwards to keep the distance between the powder bed and the electron beam substantially constant.

As schematically indicated in FIG. 1, the apparatus 1 is suitably provided with a control unit 40. The control unit 40 is arranged for controlling the platform device 5. The control unit 40 can be configured to control rotation of the support member 5 about the first rotation axis 13 and to control rotation of the support member 5 and the first rotation axis 13 about the second rotation axis 14. The control unit 40 can also be configured to control linear movement of the support member 5 in the direction 15 in parallel with the first rotation axis 13. The control unit 40 may comprise one or more microprocessors and/or one or more memory devices or any other components for executing computer programs or receiving or sending control signals for providing the control function. Particularly, the control unit 40 is preferably provided with a computer program for performing all steps of any embodiment of the method described herein. The control unit can be a separate component or be integrated in another controller. The control unit can be arranged to control other parameters of the process and/or the apparatus 1. The control unit 40 can be part of a controller used also for other functions of the AM machine, such as control of the powder distributor device 10, the energy beam 8, etc.

Figure 2:
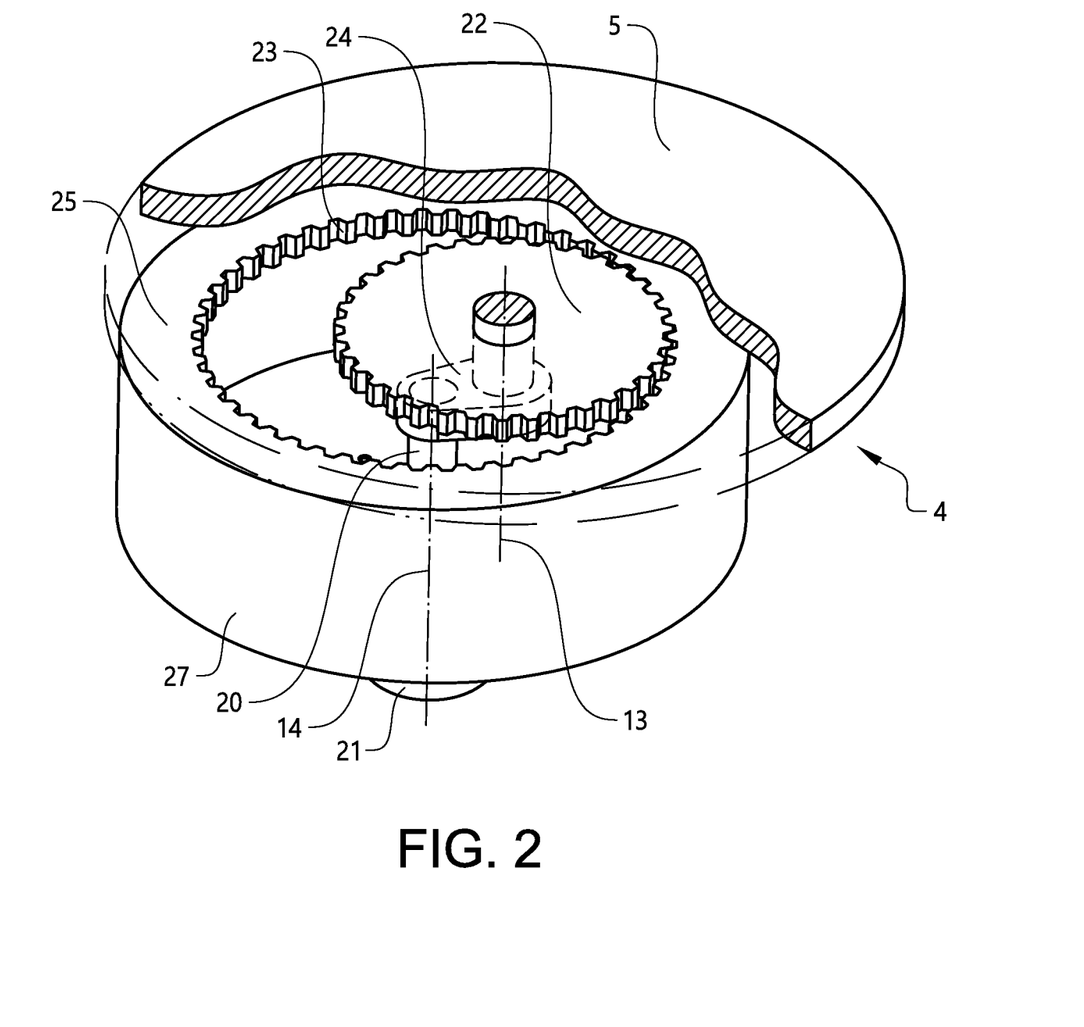
FIG. 2 is a perspective view from above of one embodiment of the platform device according to the invention.
Figure 3:
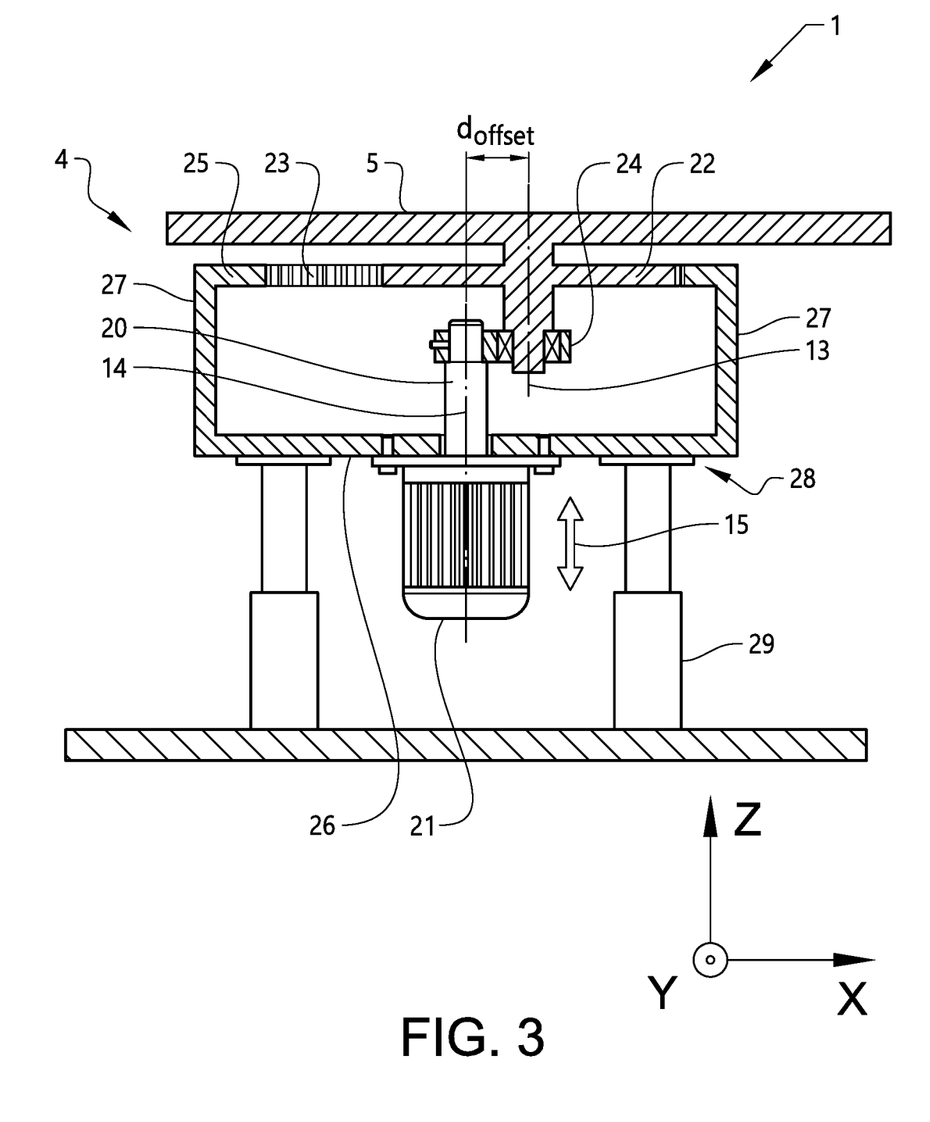
FIG. 3 is a cross section view of the platform device in FIG. 2.

With reference to FIGS. 2 and 3, one example embodiment of the platform device 4 will be described more in detail. FIG. 2 is a perspective view of the platform device and FIG. 3 is a cross section view. In FIG. 2 a portion of the support member 5 is cut away for illustration purposes. The platform device 4 has a drive shaft 20 extending along the second rotation axis 14 for rotating the support member 5 and the first rotation axis 13 about the second rotation axis 14. Further, the drive shaft 20 is arranged for rotating the support member 5 about the first rotation axis 13 when the support member 5 being rotated about the second rotation axis 14. Thus, by rotation of the drive shaft 20, the support member 5 is rotated both about the second rotation axis 14 and the first rotation axis 13. The drive shaft 20 can be driven by any suitable motor 21, such as for example an electric or a hydraulic motor.

Further, in the example embodiment illustrated in FIGS. 2 and 3, the platform device 4 has a gear wheel 22 and an internal gear member 23 for providing the rotation about the second rotation axis 14. The gear wheel 22 is attached and rotationally locked to the support member 5 and arranged for rotating about the first rotation axis 13. Thus, the support member 5 and the gear wheel 22 will rotate together about the first rotation axis 13 when driven. Optionally, the support member and the gear wheel are made in one piece. The gear wheel 22 is in engagement with the internal gear member 23 for movement about the second rotation axis 14. The gear wheel 22 is arranged on an arm 24 or similar of the drive shaft 20. The gear wheel 22 is journaled in the arm 24 to be rotatable about the first axis 13 relative to the drive shaft 20. The arm 24 extends in the radial direction from the drive shaft 20 and the gear wheel 22 is arranged in the arm 24 such that the rotation axis of the gear wheel 22 (i.e. the first rotation axis 13) and the second rotation axis 14 are arranged off-set relative to each other with the off-set distance doffset. The off-set distance between the second rotation axis 14 and the first rotation axis 13 is determined by the selected distance between the drive shaft 20 and the gear wheel 22.

In addition to the current off-set distance, the sizes of the gear wheel 22 and the internal gear member 23 can also be adapted to each other and selected to achieve the desired rotational speeds of the support member 5 about the first rotation axis 13 and the second rotation axis 14. The ratio between the diameter of the internal gear member and the diameter of the gear wheel will determine the ratio between the rotation speed of the support member 5 about the first rotation axis 13 and the rotation speed of the support member 5 about the second rotation axis 14. The ratio between the internal gear member 23 and the gear wheel 22 is suitably adapted to other relevant process and/or apparatus parameters. The ratio is however often above 1 and less than 10, and preferably in the range 2-5.

For other embodiments, such as for example where the support member is driven about the first axis and the second axis independently of each other or at least separately, the ratio between the rotation speed of the support member about the first rotation axis and the rotation speed of the support member about the second rotation axis, can be selected also in the range 0.1-1. Further, ratio values exceeding 10 are also possible.

The internal gear member 23 is arranged to be fixed by attachment to any suitable position of the apparatus 1. In other words; the gear wheel 22 and the support member 5 are arranged to be rotatable relative to the internal gear member 23. The internal gear member 23 can be arranged in a plate 25 which in turn is attached to a plate 26 to which the motor 21 is attached. The internal gear member plate 25 can be attached by one or more wall parts 27 extending between the motor plate 26 and the internal gear member plate 25. For example, the wall part can be a tube 27 arranged outside of the drive shaft 20 and the internal gear member 23.

The drive shaft 20 is arranged for linear movement in the direction 15 in parallel with the first rotation axis 13 for linear movement of the support member 5. Although the linear movement of the support member can be arranged in many ways, in the example embodiment illustrated, a unit 28 comprising the motor plate 26 supporting the motor 21 with the drive shaft 20 and the internal gear member plate 25 is movable in the vertical direction 15. This unit 28 can be journaled for linear movement in the vertical direction and be driven upwards or downwards by any suitable motor and a pinion rack, belt or chain, or by any kind of suitable work cylinder 29.

The invention also relates to a method for forming a three-dimensional article 2 layer by layer by successive fusion of selected areas of powder layers 3. As regards components of the apparatus or the platform device related to the method, reference is made to the description hereinabove and FIGS. 1, 2 and 3. The method comprises the steps of using a platform device 4 having a support member 5 with a surface 6 for receiving powder, rotating the support member 5 about a first rotation axis 13 having an extension direction substantially perpendicular to the surface 6, and rotating the support member 5 and the first rotation axis 13 about a second rotation axis 14 being arranged substantially in parallel with and off-set to the first rotation axis 13.

The support member 5 is preferably rotated simultaneously about the first rotation axis 13 and the second rotation axis 14. Although the support member 5 could be rotated intermittently, by continuously rotating the support member 5 about the first rotation axis 13 at a predetermined first speed and about the second rotation axis 14 at a predetermined second speed, the entire surface 6 or at least an increased portion of the support member surface 6 can be used for continuously receiving powder to be selectively melted at the same time as the manufacturing can be optimized and well controlled.

The method suitably comprises the step of moving the support member 5 downwards in a direction 15 in parallel with the first rotation axis 13, preferably by continuously moving the support member 5 at a predetermined speed. Thus, the linear movement of the support member 5 can be performed at the same time as the rotation movements of the support member 5 take place.

The method can comprise the step of rotating the support member 5 about the first rotation axis 13 in a first rotation direction 30 and about the second rotation axis 14 in a second direction 33 opposite to the first rotation direction 30. See also FIG. 4.

Figure 4:
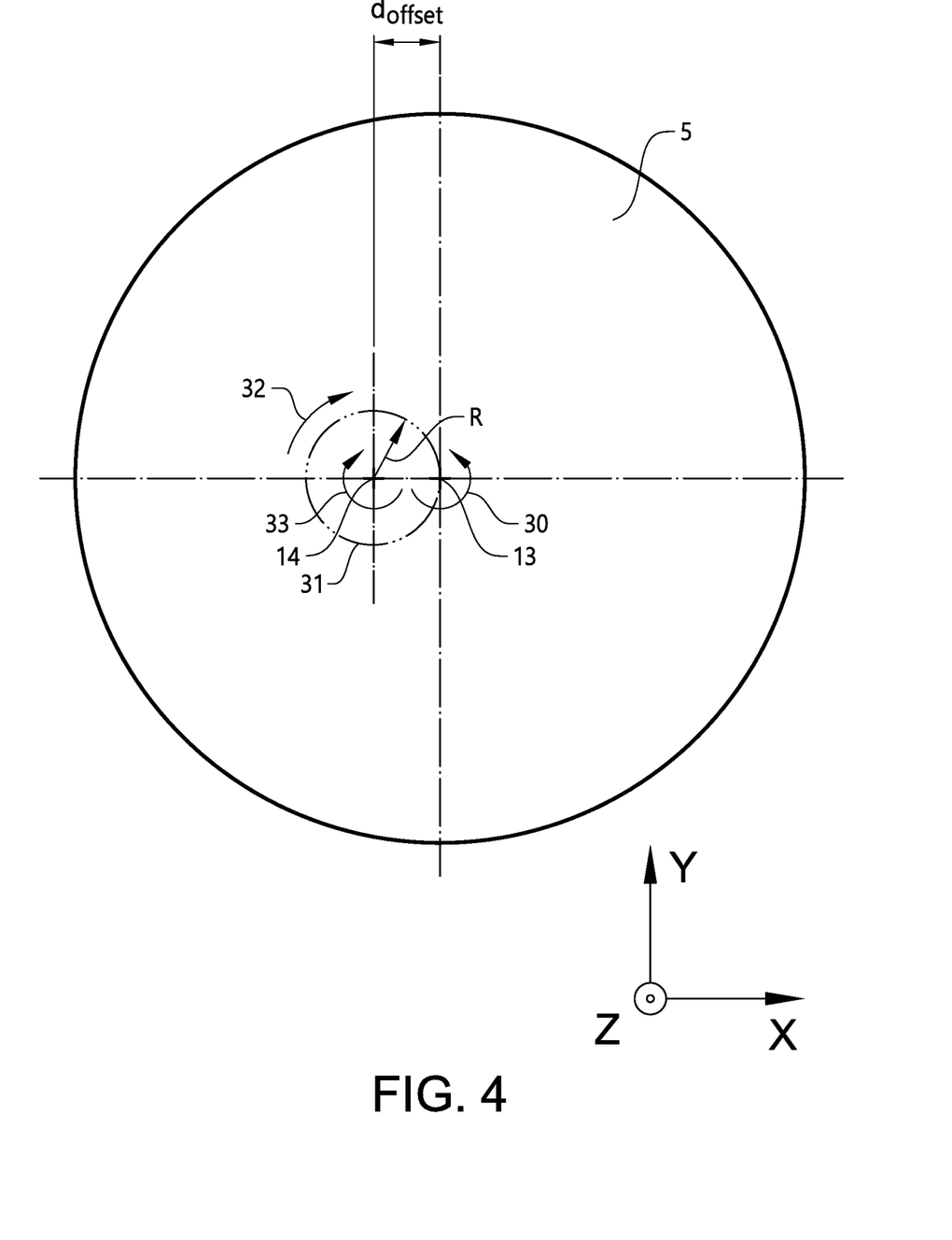
FIG. 4 is a top view showing an example of a movement pattern of the work plate of the platform device.

FIG. 4 is a schematic illustration of an example of a movement pattern of the support member 5 in the XY-plane that can be obtained by a platform device or method described herein. The second rotation axis 14 has a fixed position. The support member 5 is rotated about the first rotation axis 13 in a first rotation direction 30. As illustrated, the first rotation axis 13 can be arranged in the centre of the support member 5. The first rotation axis 13 and the second rotation axis 14 are arranged off-set relative to each other. The support member 5 and the first rotation axis 13 is also rotated about the second rotation axis 14. Further, the support member 5 is rotated about the second rotation axis 14 in a second rotation direction 33 that is opposite to the first rotation direction 30. This means that the first rotation axis 13 is moved along a circle 31, where a circle radius R extends from the second rotation axis 14 having a fixed position to the first rotation axis 13. In other words, the circle radius R corresponds to the off-set distance doffset. The movement of the first rotation axis 13 along the circle 31 is indicated by an arrow 32.

Although the first rotation direction 30 and the second rotation direction 33 are opposite to each other in FIG. 4, in another example embodiment the support member 5 could suitably be rotated in the same direction about the first rotation axis and the second rotation axis.

In another aspect of the invention it is provided a program element configured and arranged when executed on a computer to implement a method as described herein. The program element may be installed in a computer readable storage medium. The computer readable storage medium may be any one of the control units described elsewhere herein or another and separate control unit, as may be desirable. The computer readable storage medium and the program element, which may comprise computer-readable program code portions embodied therein, may further be contained within a non-transitory computer program product. Further details regarding these features and configurations are provided, in turn, below.

As mentioned, various embodiments of the present invention may be implemented in various ways, including as non-transitory computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory VRAM, cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like, as have been described elsewhere herein. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Various embodiments are described below with reference to block diagrams and flowchart illustrations of apparatuses, methods, systems, and computer program products. It should be understood that each block of any of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, could be implemented by special purpose hardware-based computer systems that perform the specified functions or operations, or combinations of special purpose hardware and computer instructions.

Figure 5:
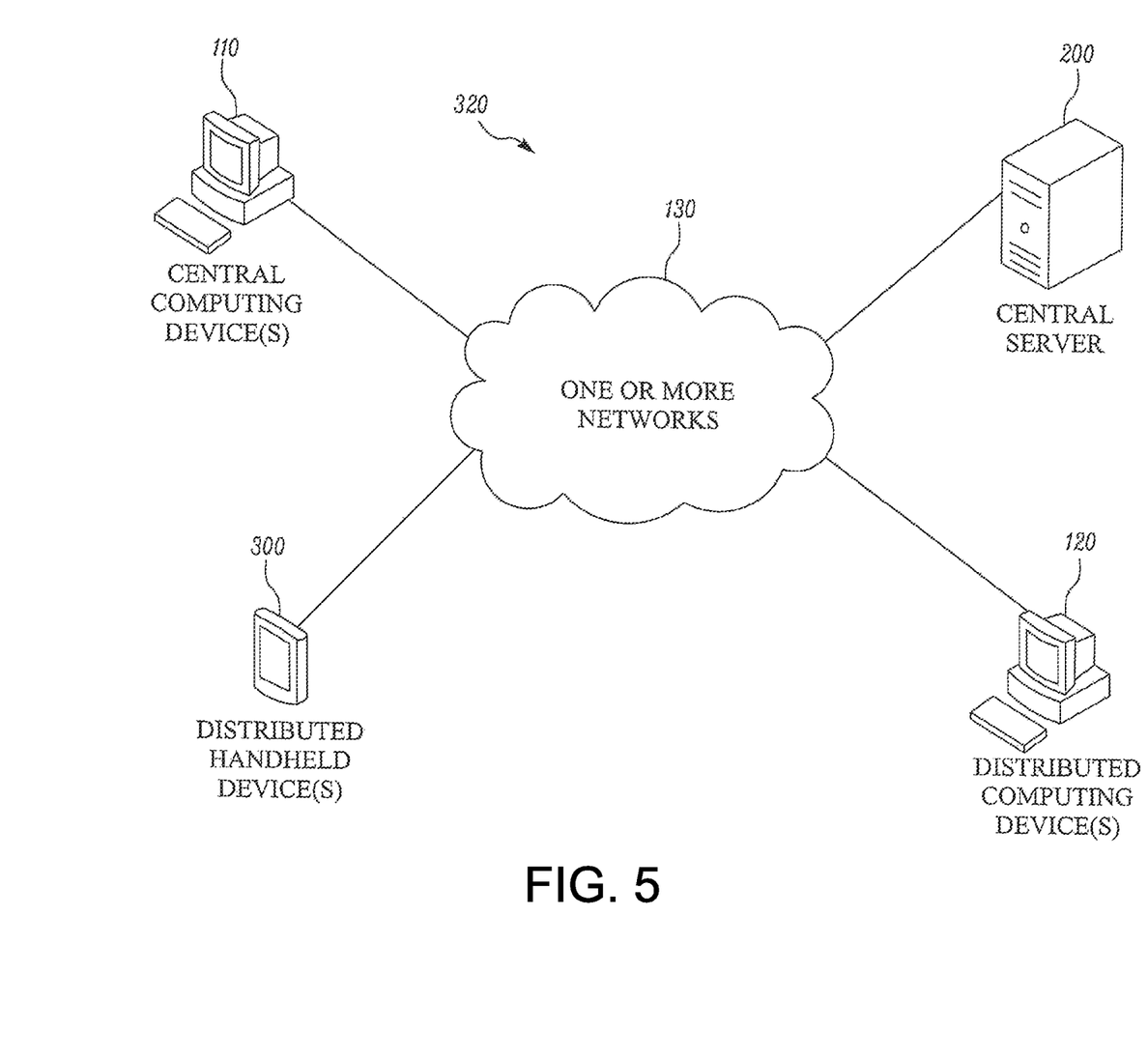
FIG. 5 is a block diagram of an exemplary system according to various embodiments.

FIG. 5 is a block diagram of an exemplary system 320 that can be used in conjunction with various embodiments of the present invention. In at least the illustrated embodiment, the system 320 may include one or more central computing devices 110, one or more distributed computing devices 120, and one or more distributed handheld or mobile devices 300, all configured in communication with a central server 200 (or control unit) via one or more networks 130. While FIG. 5 illustrates the various system entities as separate, stand-alone entities, the various embodiments are not limited to this particular architecture.

According to various embodiments of the present invention, the one or more networks 130 may be capable of supporting communication in accordance with any one or more of a number of second-generation (2G), 2.5G, third-generation (3G), and/or fourth-generation (4G) mobile communication protocols, or the like. More particularly, the one or more networks 130 may be capable of supporting communication in accordance with 2G wireless communication protocols IS-136 (TDMA), GSM, and IS-95 (CDMA). Also, for example, the one or more networks 130 may be capable of supporting communication in accordance with 2.5G wireless communication protocols GPRS, Enhanced Data GSM Environment (EDGE), or the like. In addition, for example, the one or more networks 130 may be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones). As yet another example, each of the components of the system 320 may be configured to communicate with one another in accordance with techniques such as, for example, radio frequency (RF), Bluetooth™, infrared (IrDA), or any of a number of different wired or wireless networking techniques, including a wired or wireless Personal Area Network ("PAN"), Local Area Network ("LAN"), Metropolitan Area Network ("MAN"), Wide Area Network ("WAN"), or the like.

Although the device(s) 110-300 are illustrated in FIG. 5 as communicating with one another over the same network 130, these devices may likewise communicate over multiple, separate networks.

According to one embodiment, in addition to receiving data from the server 200, the distributed devices 110, 120, and/or 300 may be further configured to collect and transmit data on their own. In various embodiments, the devices 110, 120, and/or 300 may be capable of receiving data via one or more input units or devices, such as a keypad, touchpad, barcode scanner, radio frequency identification (RFID) reader, interface card (e.g., modem, etc.) or receiver. The devices 110, 120, and/or 300 may further be capable of storing data to one or more volatile or non-volatile memory modules, and outputting the data via one or more output units or devices, for example, by displaying data to the user operating the device, or by transmitting data, for example over the one or more networks 130.

In various embodiments, the server 200 includes various systems for performing one or more functions in accordance with various embodiments of the present invention, including those more particularly shown and described herein. It should be understood, however, that the server 200 might include a variety of alternative devices for performing one or more like functions, without departing from the spirit and scope of the present invention. For example, at least a portion of the server 200, in certain embodiments, may be located on the distributed device(s) 110, 120, and/or the handheld or mobile device(s) 300, as may be desirable for particular applications. As will be described in further detail below, in at least one embodiment, the handheld or mobile device(s) 300 may contain one or more mobile applications 330 which may be configured so as to provide a user interface for communication with the server 200, all as will be likewise described in further detail below.

Figure 6:
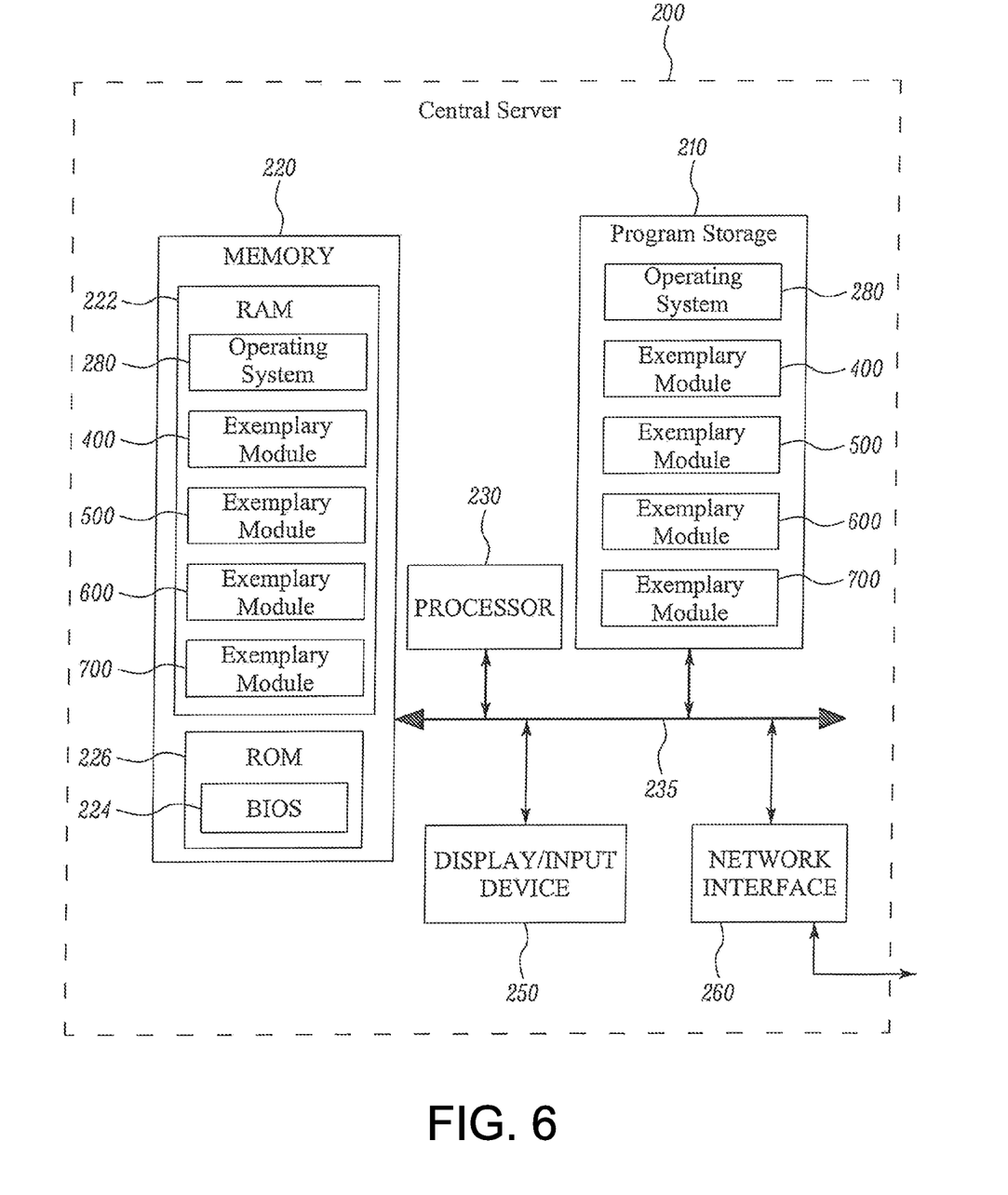
FIG. 6 is a schematic block diagram of an exemplary server according to various embodiments.

FIG. 6 is a schematic diagram of the server 200 according to various embodiments. The server 200 includes a processor 230 that communicates with other elements within the server via a system interface or bus 235. Also included in the server 200 is a display/input device 250 for receiving and displaying data. This display/input device 250 may be, for example, a keyboard or pointing device that is used in combination with a monitor. The server 200 further includes memory 220, which typically includes both read only memory (ROM) 226 and random access memory (RAM) 222. The server's ROM 226 is used to store a basic input/output system 224 (BIOS), containing the basic routines that help to transfer information between elements within the server 200. Various ROM and RAM configurations have been previously described herein.

In addition, the server 200 includes at least one storage device or program storage 210, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 210 are connected to the system bus 235 by an appropriate interface. The storage devices 210 and their associated computer-readable media provide nonvolatile storage for a personal computer. As will be appreciated by one of ordinary skill in the art, the computer-readable media described above could be replaced by any other type of computer-readable media known in the art. Such media include, for example, magnetic cassettes, flash memory cards, digital video disks, and Bernoulli cartridges.

Although not shown, according to an embodiment, the storage device 210 and/or memory of the server 200 may further provide the functions of a data storage device, which may store historical and/or current delivery data and delivery conditions that may be accessed by the server 200. In this regard, the storage device 210 may comprise one or more databases. The term "database" refers to a structured collection of records or data that is stored in a computer system, such as via a relational database, hierarchical database, or network database and as such, should not be construed in a limiting fashion.

A number of program modules (e.g., exemplary modules 400-700) comprising, for example, one or more computer-readable program code portions executable by the processor 230, may be stored by the various storage devices 210 and within RAM 222. Such program modules may also include an operating system 280. In these and other embodiments, the various modules 400, 500, 600, 700 control certain aspects of the operation of the server 200 with the assistance of the processor 230 and operating system 280. In still other embodiments, it should be understood that one or more additional and/or alternative modules may also be provided, without departing from the scope and nature of the present invention.

In various embodiments, the program modules 400, 500, 600, 700 are executed by the server 200 and are configured to generate one or more graphical user interfaces, reports, instructions, and/or notifications/alerts, all accessible and/or transmittable to various users of the system 320. In certain embodiments, the user interfaces, reports, instructions, and/or notifications/alerts may be accessible via one or more networks 130, which may include the Internet or other feasible communications network, as previously discussed.

In various embodiments, it should also be understood that one or more of the modules 400, 500, 600, 700 may be alternatively and/or additionally (e.g., in duplicate) stored locally on one or more of the devices 110, 120, and/or 300 and may be executed by one or more processors of the same. According to various embodiments, the modules 400, 500, 600, 700 may send data to, receive data from, and utilize data contained in one or more databases, which may be comprised of one or more separate, linked and/or networked databases.

Also located within the server 200 is a network interface 260 for interfacing and communicating with other elements of the one or more networks 130. It will be appreciated by one of ordinary skill in the art that one or more of the server 200 components may be located geographically remotely from other server components. Furthermore, one or more of the server 200 components may be combined, and/or additional components performing functions described herein may also be included in the server.

While the foregoing describes a single processor 230, as one of ordinary skill in the art will recognize, the server 200 may comprise multiple processors operating in conjunction with one another to perform the functionality described herein. In addition to the memory 220, the processor 230 can also be connected to at least one interface or other means for displaying, transmitting and/or receiving data, content or the like. In this regard, the interface(s) can include at least one communication interface or other means for transmitting and/or receiving data, content or the like, as well as at least one user interface that can include a display and/or a user input interface, as will be described in further detail below. The user input interface, in turn, can comprise any of a number of devices allowing the entity to receive data from a user, such as a keypad, a touch display, a joystick or other input device.

Still further, while reference is made to the "server" 200, as one of ordinary skill in the art will recognize, embodiments of the present invention are not limited to traditionally defined server architectures. Still further, the system of embodiments of the present invention is not limited to a single server, or similar network entity or mainframe computer system. Other similar architectures including one or more network entities operating in conjunction with one another to provide the functionality described herein may likewise be used without departing from the spirit and scope of embodiments of the present invention. For example, a mesh network of two or more personal computers (PCs), similar electronic devices, or handheld portable devices, collaborating with one another to provide the functionality described herein in association with the server 200 may likewise be used without departing from the spirit and scope of embodiments of the present invention.

According to various embodiments, many individual steps of a process may or may not be carried out utilizing the computer systems and/or servers described herein, and the degree of computer implementation may vary, as may be desirable and/or beneficial for one or more particular applications.

Figure 7:
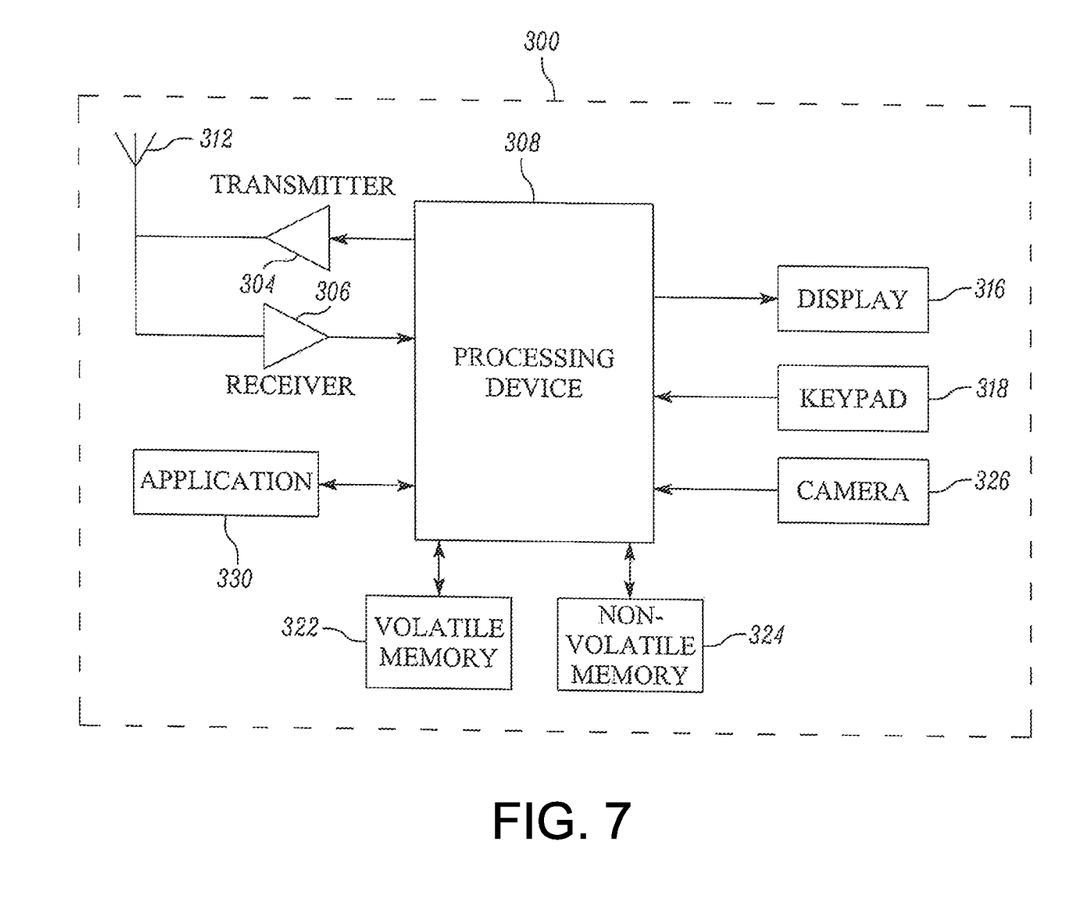
FIG. 7 is a schematic block diagram of an exemplary mobile device according to various embodiments.

FIG. 7 provides an illustrative schematic representative of a mobile device 300 that can be used in conjunction with various embodiments of the present invention. Mobile devices 300 can be operated by various parties. As shown in FIG. 7, a mobile device 300 may include an antenna 312, a transmitter 304 (e.g., radio), a receiver 306 (e.g., radio), and a processing element 308 that provides signals to and receives signals from the transmitter 304 and receiver 306, respectively.

The signals provided to and received from the transmitter 304 and the receiver 306, respectively, may include signaling data in accordance with an air interface standard of applicable wireless systems to communicate with various entities, such as the server 200, the distributed devices 110, 120, and/or the like. In this regard, the mobile device 300 may be capable of operating with one or more air interface standards, communication protocols, modulation types, and access types. More particularly, the mobile device 300 may operate in accordance with any of a number of wireless communication standards and protocols. In a particular embodiment, the mobile device 300 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the mobile device 300 may according to various embodiments communicate with various other entities using concepts such as Unstructured Supplementary Service data (USSD), Short Message Service (SMS), Multimedia Messaging Service (MMS), Dual-Tone Multi-Frequency Signaling (DTMF), and/or Subscriber Identity Module Dialer (SIM dialer). The mobile device 300 can also download changes, add-ons, and updates, for instance, to its firmware, software (e.g., including executable instructions, applications, program modules), and operating system.

According to one embodiment, the mobile device 300 may include a location determining device and/or functionality. For example, the mobile device 300 may include a GPS module adapted to acquire, for example, latitude, longitude, altitude, geocode, course, and/or speed data. In one embodiment, the GPS module acquires data, sometimes known as ephemeris data, by identifying the number of satellites in view and the relative positions of those satellites.

The mobile device 300 may also comprise a user interface (that can include a display 316 coupled to a processing element 308) and/or a user input interface (coupled to a processing element 308). The user input interface can comprise any of a number of devices allowing the mobile device 300 to receive data, such as a keypad 318 (hard or soft), a touch display, voice or motion interfaces, or other input device. In embodiments including a keypad 318, the keypad can include (or cause display of) the conventional numeric (0-9) and related keys (#, *), and other keys used for operating the mobile device 300 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The mobile device 300 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database mapping systems, data, applications, programs, program modules, scripts, source code, object code, byte code, compiled code, interpreted code, machine code, executable instructions, and/or the like to implement the functions of the mobile device 300.

The mobile device 300 may also include one or more of a camera 326 and a mobile application 330. The camera 326 may be configured according to various embodiments as an additional and/or alternative data collection feature, whereby one or more items may be read, stored, and/or transmitted by the mobile device 300 via the camera. The mobile application 330 may further provide a feature via which various tasks may be performed with the mobile device 300. Various configurations may be provided, as may be desirable for one or more users of the mobile device 300 and the system 320 as a whole.

The invention is not limited to the above-described embodiments and many modifications are possible within the scope of the following claims. Such modifications may, for example, involve using a different source of energy beam than the exemplified electron beam such as a laser beam. Other materials than metallic powder may be used, such as the non-limiting examples of: electrically conductive polymers and powder of electrically conductive ceramics. Images taken from more than 2 layers may also be possible, i.e., in an alternative embodiment of the present invention for detecting a defect at least one image from at least three, four or more layers are used. A defect may be detected if the defect position in the three, four or more layers are at least partly overlapping each other. The thinner the powder layer the more powder layers may be used in order to detect a factual defect.

Indeed, a person of ordinary skill in the art would be able to use the information contained in the preceding text to modify various embodiments of the invention in ways that are not literally described, but are nevertheless encompassed by the attached claims, for they accomplish substantially the same functions to reach substantially the same results. Therefore, it is to be understood that the invention is not limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A platform device for forming a three-dimensional article in an additive manufacturing machine layer by layer by successive fusion of selected areas of powder layers, which selected areas correspond to successive layers of the three-dimensional article being formed, the platform device comprising a support member with a surface for receiving powder, the support member being rotatable about a first rotation axis extending in a direction substantially perpendicular to the surface, the support member and the first rotation axis further being rotatable about a second rotation axis arranged substantially in parallel with and off-set to the first rotation axis by a drive shaft extending and configured for movement of the support member along the second rotation axis, and the second rotation axis extending through the support member.

2. The platform device according to claim 1, wherein the support member is configured for linear movement in a direction in parallel with the first rotation axis.

3. The platform device according to claim 1, wherein the platform device has the drive shaft extending along the second rotation axis and driven for rotating the support member and the first rotation axis about the second rotation axis.

4. The platform device according to claim 3, wherein the drive shaft is configured for rotating the support member about the first rotation axis when the support member is being rotated about the second rotation axis.

5. The platform device according to claim 3, wherein the drive shaft is configured for linear movement in a direction in parallel with the first rotation axis for linear movement of the support member.

6. The platform device according to claim 1, wherein the platform device further comprises a gear wheel and an internal gear member, the gear wheel being attached and rotationally locked to the support member and configured for rotating about the first rotation axis, and the gear wheel further being in engagement with the internal gear member for movement of the gear wheel and support member about the second rotation axis.

7. The platform device according to claim 1, wherein the first rotation axis and the second rotation axis are configured with an off-set distance $d_{offset}$ relative to each other in the range of 1 mm<$d_{offset}$<200 mm.

8. The platform device according to claim 7, wherein the off-set distance doffset is in the range of 5 mm<$d_{offset}$<150 mm.

9. The platform device according to claim 7, wherein the off-set distance $d_{offset}$ is in the range of 20 mm<$d_{offset}$<100 mm.

10. The platform device according to claim 1, wherein the first rotation axis is configured to be directed substantially vertically.

11. The platform device according to claim 1, wherein the support member is configured for rotating about the first rotation axis in a first rotation direction and for rotating about the second rotation axis in a second rotation direction opposite to the first rotation direction.

12. A method for forming a three-dimensional article in an additive manufacturing machine layer by layer by successive fusion of selected areas of powder layers, which selected areas correspond to successive layers of the three-dimensional article being formed, the method comprising the steps of:
using the platform device according to claim 1 having the support member with the surface for receiving powder,
rotating the support member about the first rotation axis, and
rotating the support member and the first rotation axis about the second rotation axis.

13. The method according to claim 12, wherein the rotating of the support member about the first rotation axis and the second rotation axis occurs simultaneously.

14. The method according to claim 13, wherein:
the rotating of the support member about the first rotation axis occurs continuously at a predetermined first speed, and
the rotating of the support member about the second rotation axis occurs continuously at a predetermined second speed.

15. The method according to claim 12, wherein the rotating of the support member about the first rotation axis occurs in a first rotation direction and the rotation of the support member about the second rotation axis occurs in a second direction opposite to the first rotation direction.

16. The method according to claim 12, further comprising moving the support member in a direction in parallel with the first rotation axis.

17. The method according to claim 16, wherein the support member continuously moves in the direction in parallel with the first rotation axis at a predetermined speed.

18. An apparatus for forming a three-dimensional article layer by layer by successive fusion of selected areas of powder layers, which selected areas correspond to successive layers of the three-dimensional article being formed, the apparatus comprising:
a control unit; and
the platform device according to claim 1 comprising the support member with the surface for receiving powder,
wherein the control unit is configured for:
rotating the support member about the first rotation axis, and rotating the support member and the first rotation axis about the second rotation axis.

19. The apparatus of claim 18, wherein the platform device further comprises
a gear wheel and an internal gear member, the gear wheel being attached and rotationally locked to the support member and configured for rotating about the first rotation axis, and the gear wheel further being in engagement with the internal gear member for movement of the gear wheel and the support member about the second rotation axis.

20. A computer program product comprising at least one non-transitory computer-readable storage medium having computer-readable program code portions embodied therein, the computer-readable program code portions comprising one or more executable portions configured for:
controlling, via a control unit, rotation of the support member of the platform device according to claim 1;
controlling, via the control unit, rotation of the support member and the first rotation axis about the second rotation axis; and
controlling, via the control unit, linear movement of the support member in a direction in parallel with the first rotation axis.

* * * * *